United States Patent
Kakihara

[11] 3,889,626
[45] June 17, 1975

[54] STERN TUBE BEARING

[75] Inventor: Minoru Kakihara, Okayama, Japan

[73] Assignee: Mitsui Shipbuilding & Engineering Co. Ltd., Tokyo, Japan

[22] Filed: May 8, 1973

[21] Appl. No.: 358,461

[30] Foreign Application Priority Data
May 16, 1972 Japan.............................. 47-56873
May 17, 1972 Japan.............................. 47-58356

[52] U.S. Cl.......... 115/34 R; 308/DIG. 12; 308/240
[51] Int. Cl........ F16c 1/24; F16c 3/14; F16c 33/00; F16c 33/66
[58] Field of Search..... 115/34 R; 308/240, DIG. 12

[56] References Cited
UNITED STATES PATENTS

| | | | |
|---|---|---|---|
| 1,236,511 | 8/1917 | Waring | 308/240 |
| 2,203,039 | 6/1940 | Asker | 308/DIG. 12 |
| 2,306,664 | 12/1942 | Scott-Paine | 115/34 R |
| 3,177,841 | 4/1965 | Galuska | 115/34 R |
| 3,631,834 | 1/1972 | Gardner | 115/34 R |

Primary Examiner—Trygve M. Blix
Assistant Examiner—Sherman D. Basinger
Attorney, Agent, or Firm—Dorfman, Herrell and Skillman

[57] ABSTRACT

A stern tube bearing characterized by providing at least one oil groove in the inside surface of the bearing metal located at a position above the horizontal plane of the bearing axis, oil passages in the outside periphery thereof, and an oil supply aperture communicating the oil groove with an oil passage opposite the groove.

2 Claims, 7 Drawing Figures

PATENTED JUN 17 1975    3,889,626

STERN TUBE BEARING

The present invention relates to a stern tube bearing of ships, particularly to the oil grooves and oil supply apertures thereof.

The object of the present invention is to provide a bearing which is secure against damage owing to seizure between the shaft and the bearing metal.

Figure 1:
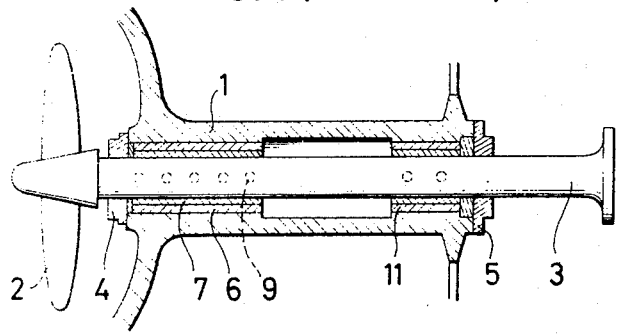
FIG. 1 is a longitudinal cross-sectional view showing a conventional stern tube bearing means.
Figure 2:
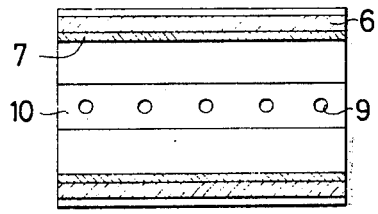
FIG. 2 is a longitudinal cross-sectional view of a conventional tube bearing.
Figure 3:
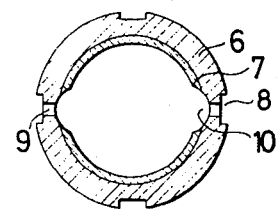
FIG. 3 is a transverse cross-sectional view thereof.

Referring to FIG. 1, the lubrication system comprises a stern tube 1 provided with a bearing 11 at the fore side and a bearing 6 for the aft side, a sealing 5 provided on the fore end, and a sealing 4 provided on the aft end, each bearing being provided with a bearing metal 7, and the stern tube being filled with lubricating oil. In the conventional system, as shown in FIGS. 2 and 3, each of the bearings 6 and 11 have laterally opposite provided oil grooves 10 and oil supply holes 9. This is based on the conception that the contact face between the shaft and the bearing is the lower side of the inner surface of the bearing metal 7. It was found by studying the behavior of the shaft in the bearing measuring the relative displacement of the bearing metal 7 and the propeller shaft 3 during operation that the shaft moves in a relatively wide area and the shaft is occasionally moved in the horizontal direction of the bearing metal when sailing at a high speed or operating the steering apparatus.

This motion is caused by a varying external hydrodynamic force acting on the propeller. Under such condition, oil grooves provided in the lateral direction cannot maintain a continuous oil film on the contact surface and therefore cannot establish required oil pressure which results in breaking of the oil film and brings about the seizure and damage of the bearing.

The present invention is characterized by providing oil grooves inside the bearing metal and oil passages on the outer periphery of the bearing, and oil supply apertures communicating the grooves with the oil passage at a position above the horizontal plane through the bearing axis. In accordance with this construction, the oil supply portion is separated far from a lateral position considered to contact position between the shaft and the bearing so that sufficient oil film may be formed, thereby preventing the reduction of oil pressure and thus avoiding accidental seizure.

Figure 4:
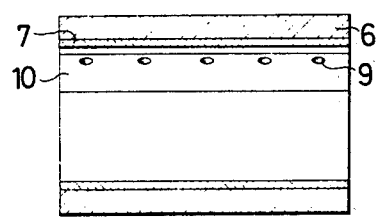
FIG. 4 is a longitudinal cross-sectional view showing one embodiment of the present invention.
Figure 5:
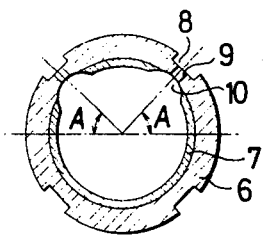
FIG. 5 is a transverse cross-sectional view thereof.

An embodiment of the present invention will be described in reference with FIGS. 4 and 5. Two oil grooves 10 are provided in an inside surface of bearing metal 5 upward at an angle of not less than 45° with the horizontal plane including axial line, and four oil passages 8 are provided on the periphery of the bearing metal two of which are opposite the oil grooves on the inside surface of the bearing. The oil grooves 10 and oil passages 8 are communicated with each other by several oil supply apertures 9. Lubricating oil is supplied into the oil groove 10 through oil supply aperture from any of oil passages 10 when the propeller shaft 3 for driving a propeller 2 rotates forwards or reversely.

Figure 6:
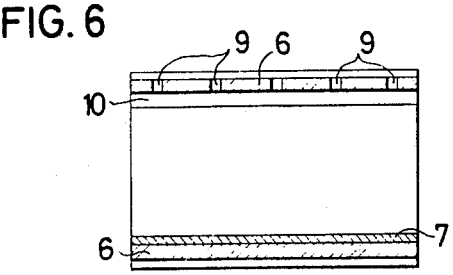
FIG. 6 is a longitudinal cross-sectional view showing another embodiment of the present invention.
Figure 7:
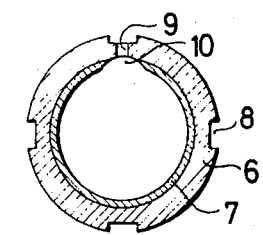
FIG. 7 is a transverse cross-sectional view thereof.

Referring to FIGS. 6 and 7, an oil groove 10 is provided in the top portion of the inside surface of the bearing metal 6 and four oil passages 8 are provided on the outer periphery of the bearing, one of which is opposite the oil groove 10, the oil passage being communicated with the oil groove 10 by oil supply aperture means 9.

Accordingly, there is no oil groove in the parts to which the shaft will be pressed and the oil film is therefore not broken, thus avoiding failures such as seizure.

What is claimed is:

1. A stern tube bearing assembly comprising a propeller shaft subject to a lateral force in a horizontal plane at a contact position, and a bearing metal having an inside cylindrical surface positioned within the stern tube and surrounding said propeller shaft to support the same, said lateral force operable to effect relative displacement of said shaft in said bearing metal surface toward and away from said contact position, said propeller shaft having a continuous cylindrical surface coaxial with the inside cylindrical surface of the bearing metal and said bearing axis, said inside cylindrical surface being continuous and uninterrupted within and below the horizontal plane of the bearing axis, and being continuously cylindrical but interrupted by at least one oil groove extending axially on the inside cylindrical surface of the bearing metal in a position above the horizontal plane of the bearing axis, oil passage means extending axially in the outer periphery of the bearing opposite said groove, means to supply bearing oil to said passage means, and oil supply aperture means communicating said oil groove with said oil passage, said groove and said oil supply aperture means being separated from said contact position to avoid breaking of the oil film at said position and to provide a continuous uninterrupted film of oil on the portion of said inside surface which supports said propeller shaft.

2. A stern tube bearing assembly according to claim 1, said oil groove being of limited circumferential extent and positioned upward from said horizontal plane at an angle of not less than 45°.

* * * * *